United States Patent
Chang et al.

(10) Patent No.: US 12,399,562 B2
(45) Date of Patent: Aug. 26, 2025

(54) SYSTEM AND METHOD FOR INTERACTING WITH EXTENDED REALITY ENVIRONMENT

(71) Applicant: HTC Corporation, Taoyuan (TW)

(72) Inventors: Tzu-Yin Chang, Taoyuan (TW); Cheng-Han Hsieh, Taoyuan (TW); Chih Chien Chen, Taoyuan (TW); Su Kang Chou, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 18/603,243

(22) Filed: Mar. 13, 2024

(65) Prior Publication Data

US 2024/0377886 A1 Nov. 14, 2024

Related U.S. Application Data

(60) Provisional application No. 63/465,250, filed on May 10, 2023.

(51) Int. Cl.
*G06F 3/01* (2006.01)
*G06F 3/03* (2006.01)
(Continued)

(52) U.S. Cl.
CPC ............ *G06F 3/014* (2013.01); *G06F 3/0304* (2013.01); *G06F 3/0346* (2013.01); *G06F 3/0354* (2013.01); *G06F 2203/0331* (2013.01)

(58) Field of Classification Search
CPC ...... G06F 3/014; G06F 3/0304; G06F 3/0346; G06F 3/0354; G06F 2203/0331; G06F 3/011; G06F 3/017
See application file for complete search history.

(56) References Cited

U.S. PATENT DOCUMENTS

2017/0329419 A1* 11/2017 Dearman .............. G06F 3/0346
2018/0364803 A1   12/2018 Khalid et al.
(Continued)

FOREIGN PATENT DOCUMENTS

CN   110727344   1/2020
CN   113423341   9/2021
(Continued)

OTHER PUBLICATIONS

"Search Report of Europe Counterpart Application", issued on Oct. 1, 2024, pp. 1-4.
(Continued)

*Primary Examiner* — Premal R Patel
(74) *Attorney, Agent, or Firm* — JCIPRNET (57) ABSTRACT

A system and a method for interacting with an extended reality environment are provided. The method includes: generating, by a touch sensor with a detection area, a touch signal, wherein the touch sensor is included in a ring-type controller; providing, by a head-mounted display, an extended reality scene; determining, by the head-mounted display, whether an object is in the detection area according to the touch signal; in response to determining the object is in the detection area, generating, by the head-mounted display, a first command according to a movement of the ring-type controller; and moving, by the head-mounted display, a cursor in the extended reality scene according to the first command.

14 Claims, 7 Drawing Sheets

(51) Int. Cl.
    *G06F 3/0346*     (2013.01)
    *G06F 3/0354*     (2013.01)

(56) References Cited

U.S. PATENT DOCUMENTS

| | | |
|---|---|---|
| 2019/0212823 A1 | 7/2019 | Keller et al. |
| 2019/0265781 A1 | 8/2019 | Kehoe et al. |
| 2021/0208698 A1 | 7/2021 | Martin et al. |
| 2022/0091683 A1* | 3/2022 | Beyhs .................. G06F 3/0362 |
| 2022/0206587 A1* | 6/2022 | Da-Yuan ................. G06F 3/014 |
| 2022/0413609 A1* | 12/2022 | Mounier ............. G06F 3/04815 |
| 2023/0161959 A1* | 6/2023 | Tham ...................... G06F 3/016 |
| | | 715/271 |
| 2024/0036646 A1* | 2/2024 | Yu ....................... G06F 3/04815 |

FOREIGN PATENT DOCUMENTS

| | | |
|---|---|---|
| TW | 1596378 | 8/2017 |
| TW | 202316237 | 4/2023 |
| WO | 2022179279 | 9/2022 |
| WO | 2022271467 | 12/2022 |

OTHER PUBLICATIONS

"Office Action of Taiwan Counterpart Application", issued on Jan. 23, 2025, p. 1-p. 9.

* cited by examiner

SYSTEM AND METHOD FOR INTERACTING WITH EXTENDED REALITY ENVIRONMENT

CROSS-REFERENCE TO RELATED APPLICATION

This application claims the priority benefit of U.S. provisional application Ser. No. 63/465,250 filed on May 10, 2023. The entirety of the above-mentioned patent application is hereby incorporated by reference herein and made a part of this specification.

BACKGROUND

Technical Field

The disclosure relates to extended reality (XR) technology, and particularly relates to a system and a method for interacting with an XR environment.

Description of Related Art

Along with the improvement of technology, head-mounted displays (HMD) with XR function become more and more popular. An HMD may create an XR environment for a user such that the user may interact with virtual objects shown in the XR scene provided by the XR environment. The user of the HMD may interact with the XR environment based on, for example, a handheld controller, hand tracking, or voice recognition. However, the manners mentioned above have some disadvantages. For example, interacting with the XR environment by using a handheld controller may cause fatigue or discomfort with prolonged use, and may be input inefficiency due to the need to physically press buttons or move the controller. Interacting with the XR environment by using hand tracking may be less accurate or less reliable than by using a physical controller, and may be input inefficiency due to the need to perform precise hand gestures. Interacting with the XR environment by using voice recognition may not always accurately interpret spoken commands, and may cause potential security issues such as unintended activation or eavesdropping.

SUMMARY

The disclosure is directed to a system and a method for interacting with an XR environment.

The present invention is directed to a system for interacting with an extended reality environment, including a ring-type controller and a head-mounted display. The ring-type controller includes a touch sensor with a detection area, wherein the touch sensor generates a touch signal. The head-mounted display is communicatively connected to the ring-type controller and is configured to: provide an extended reality scene; determine whether an object is in the detection area according to the touch signal; in response to determining the object is in the detection area, generate a first command according to a movement of the ring-type controller; and move a cursor in the extended reality scene according to the first command.

The present invention is directed to a method for interacting with an extended reality environment, including: generating, by a touch sensor with a detection area, a touch signal, wherein the touch sensor is included in a ring-type controller; providing, by a head-mounted display, an extended reality scene; determining, by the head-mounted display, whether an object is in the detection area according to the touch signal; in response to determining the object is in the detection area, generating, by the head-mounted display, a first command according to a movement of the ring-type controller; and moving, by the head-mounted display, a cursor in the extended reality scene according to the first command.

The present invention is directed to a system for interacting with an extended reality environment, including a ring-type controller and a head-mounted display. The ring-type controller includes an inertial measurement unit. The head-mounted display is communicatively connected to the ring-type controller and is configured to: provide an extended reality scene; receive a measurement result from the inertial measurement unit; determine a yaw angle according to the measurement result and a location of a carpometacarpal joint of the user's thumb wearing the ring-type controller; and select one of a first virtual object and a second virtual object in the extended reality scene according to the yaw angle.

Based on the above description, the present invention provides a convenient and intuitive way for the user of an HMD to interact with the XR environment.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
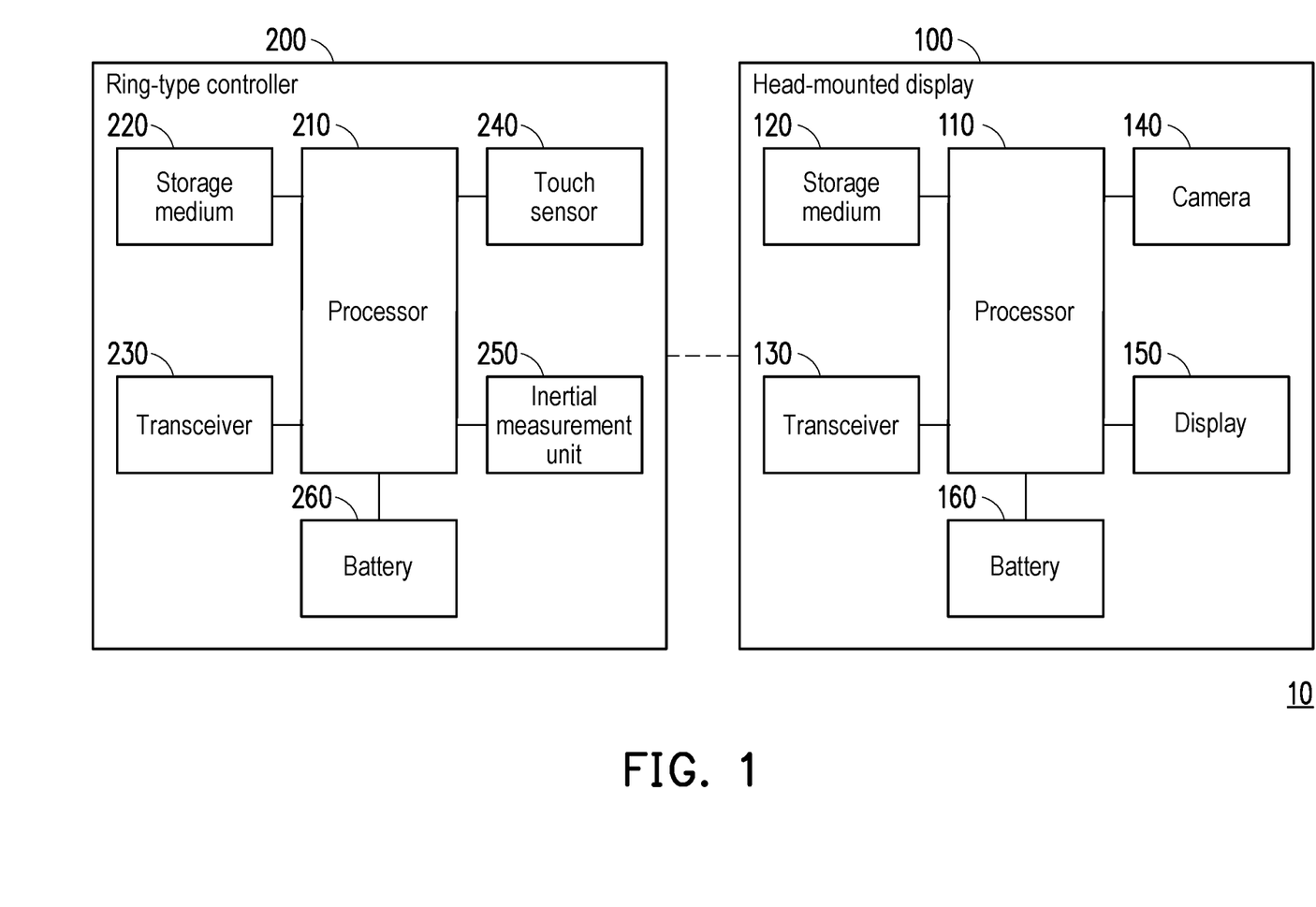
FIG. 1 illustrates a schematic diagram of a system for interacting with an XR environment according to one embodiment of the present invention.

FIG. 1 illustrates a schematic diagram of a system 10 for interacting with an XR environment according to one embodiment of the present invention, wherein the system 10 may include an HMD 100 and a ring-type controller 200 communicatively connecting to the HMD 100. The HMD 100 may be worn on a user's head and may be used for providing a XR environment (or XR scene) such as a virtual reality (VR) environment, an augmented reality (AR) environment, or a mixed reality (MR) environment for the user. The ring-type controller 200 is suitable to be worn on a finger (e.g., thumb) of the user. When the ring-type controller 200 is worn by the user, the user may interact with the XR scene provided by the HMD 100 by the gestures performed by the hand wearing the ring-type controller 200.

The HMD 100 may include a processor 110, a storage medium 120, a transceiver 130, a camera 140, a display 150, and a battery 160. The processor 110 may be, for example, a central processing unit (CPU), or other programmable general purpose or special purpose micro control unit (MCU), a microprocessor, a digital signal processor (DSP), a programmable controller, an application specific integrated circuit (ASIC), a graphics unit (GPU), an arithmetic logic unit (ALU), a complex programmable logic device (CPLD), a field programmable gate array (FPGA), or other similar device or a combination of the above devices. The processor 110 may be coupled to the storage medium 120, the transceiver 130, the camera 140, the display 150, and the battery 160.

The storage medium 120 may be, for example, any type of fixed or removable random access memory (RAM), a read-only memory (ROM), a flash memory, a hard disk drive (HDD), a solid state drive (SSD) or similar element, or a combination thereof. The storage medium 120 may be a non-transitory computer readable storage medium configured to record a plurality of executable computer programs, modules, or applications to be loaded by the processor 110 to perform the functions of the HMD 100.

The transceiver 130 may be configured to transmit or receive wired/wireless signals. The transceiver 130 may also perform operations such as low noise amplifying, impedance matching, frequency mixing, up or down frequency conversion, filtering amplifying, and so forth. The processor 110 may communicate with other devices (e.g., ring-type controller 200) via the transceiver 130.

The camera 140 may be a photographic device for capturing images. The camera 140 may include a complementary metal oxide semiconductor (CMOS) sensor or a charge-coupled device (CCD) sensor.

The display 150 may be used for displaying video data or image data such as an XR scene of the XR environment for the user wearing the HMD 100. The display 150 may include a liquid-crystal display (LCD) or an organic light-emitting diode (OLED) display. In one embodiment, the display 150 may provide an image beam to the eye of the user to form the image on the retinal of the user such that the user may see an XR scene created by the HMD 100.

The battery 160 may provide the power needed by the HMD 100. The battery 160 may include a carbon-zinc battery, an alkaline battery, a lithium battery, a lead-acid battery, a nickel-metal hydride battery, a nickel-cadmium battery, or a lithium-ion battery.

The ring-type controller 200 may include a processor 210, a storage medium 220, a transceiver 230, and a battery 260. In one embodiment, the ring-type controller 200 may further include a touch sensor 240 or an inertial measurement unit (IMU) 250. The processor 210 may be, for example, a CPU, or other programmable general purpose or special purpose MCU, a microprocessor, a DSP, a programmable controller, an ASIC, a graphics unit GPU, an ALU, a CPLD, a FPGA, or other similar device or a combination of the above devices. The processor 210 may be coupled to the storage medium 220, the transceiver 230, the touch sensor 240, the IMU 250, and the battery 260.

The storage medium 220 may be, for example, any type of fixed or removable RAM, a ROM, a flash memory, a HDD, an SSD or similar element, or a combination thereof. The storage medium 220 may be a non-transitory computer readable storage medium configured to record a plurality of executable computer programs, modules, or applications to be loaded by the processor 210 to perform the functions of the ring-type controller 200.

The transceiver 230 may be configured to transmit or receive wired/wireless signals. The transceiver 230 may also perform operations such as low noise amplifying, impedance matching, frequency mixing, up or down frequency conversion, filtering amplifying, and so forth. The processor 210 may communicate with other devices (e.g., HMD 100) via the transceiver 230. The processor 210 may to transmit sensed data to the HMD 100 via the transceiver 230, wherein the sensed data may include, for example, the measurement result generated by the IMU 250 or the touch signal generated by the touch sensor 240.

The touch sensor 240 may include an optical sensing component such as a CMOS sensor or a CCD sensor. The touch sensor 240 may have a detection area for detecting whether an object is in the detection area and may generate a touch signal accordingly. Assume that the ring-type controller 200 is been worn on a hand of a user or a finger (e.g., thumb) of the hand. In one embodiment, the detection area of the touch sensor 240 may be directed to another finger (e.g., index finger or middle finger) of the hand. In one embodiment, the detection area of the touch sensor 240 may be directed to a plane of an object (e.g., a table) when the ring-type controller 200 is worn on the hand resting on the plane of the object. The touch sensor 240 may include an optical sensor which may generate an optical signal, a proximity sensor, a capacitive sensor, or a resistive sensor.

The IMU 250 may include an accelerometer or a gyroscope. The IMU 250 may detect the acceleration or the angular acceleration of the ring-type controller 200 and may generate a measurement result accordingly.

The battery 260 may provide the power needed by the ring-type controller 200. The battery 260 may include a carbon-zinc battery, an alkaline battery, a lithium battery, a lead-acid battery, a nickel-metal hydride battery, a nickel-cadmium battery, or a lithium-ion battery.

Figure 2:
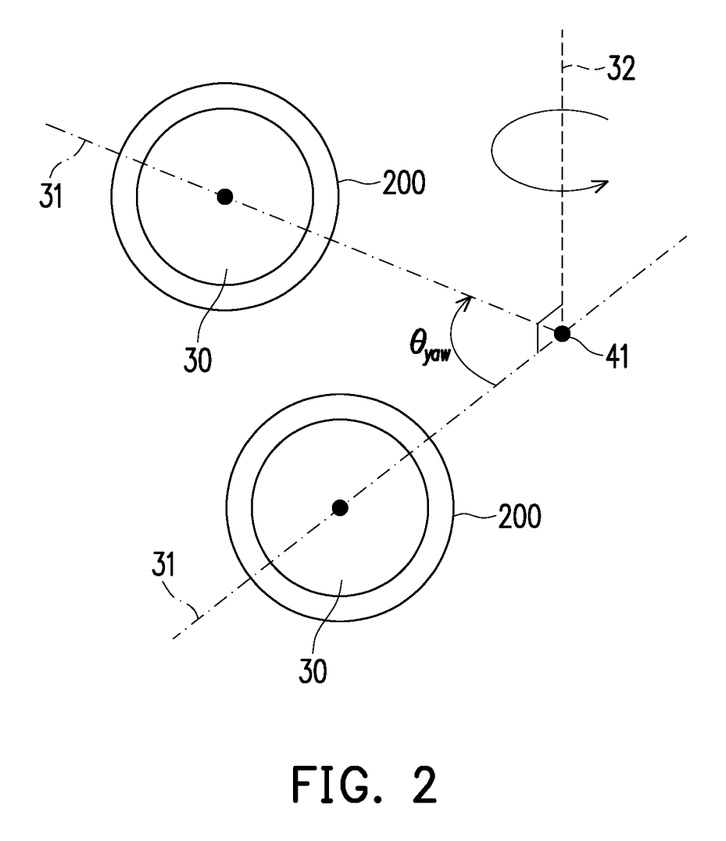
FIG. 2 illustrates a schematic diagram of the ring-type controller according to one embodiment of the present invention.

The processor 110 may measure a yaw angle of the ring-type controller 200 (or a location of a location of a carpometacarpal (CRC) joint of a user's thumb wearing the ring-type controller 200). FIG. 2 illustrates a schematic diagram of the ring-type controller 200 according to one embodiment of the present invention. It is assumed that the shape of the ring-type controller 200 may form a virtual circular plane 30 as shown in FIG. 2. A yaw axis 32 of the ring-type controller 200 may be perpendicular to a normal 31 of the virtual circular plane 30, wherein the normal 31 may be the normal passing through the center of the virtual circular plane 30. The yaw axis 32 may intersect with the normal 31 at joint 41, wherein joint 41 may represent the location of the carpometacarpal joint of the user's thumb wearing the ring-type controller 200. If the ring-type controller 200 rotates around the yaw axis 32, the processor 110 may measure yaw angle $\theta_{yaw}$ of the ring-type controller 200.

In one embodiment, the processor 110 may receive the measurement result generated by the IMU 250 and may determine the yaw angle $\theta_{yaw}$ of the ring-type controller 200 (or the location of the CRC joint of the user) according to the measurement result. In one embodiment, the processor 110 may capture an image of the hand of the user wearing the ring-type controller 200 by the camera 140 and may determine the yaw angle $\theta_{yaw}$ of the ring-type controller 200 according to the image. In one embodiment, the processor

110 may determine the yaw angle $\theta_{yaw}$ of the ring-type controller 200 by jointly considering the measurement result of the IMU 250 and the image of the ring-type controller 200.

Figure 3:
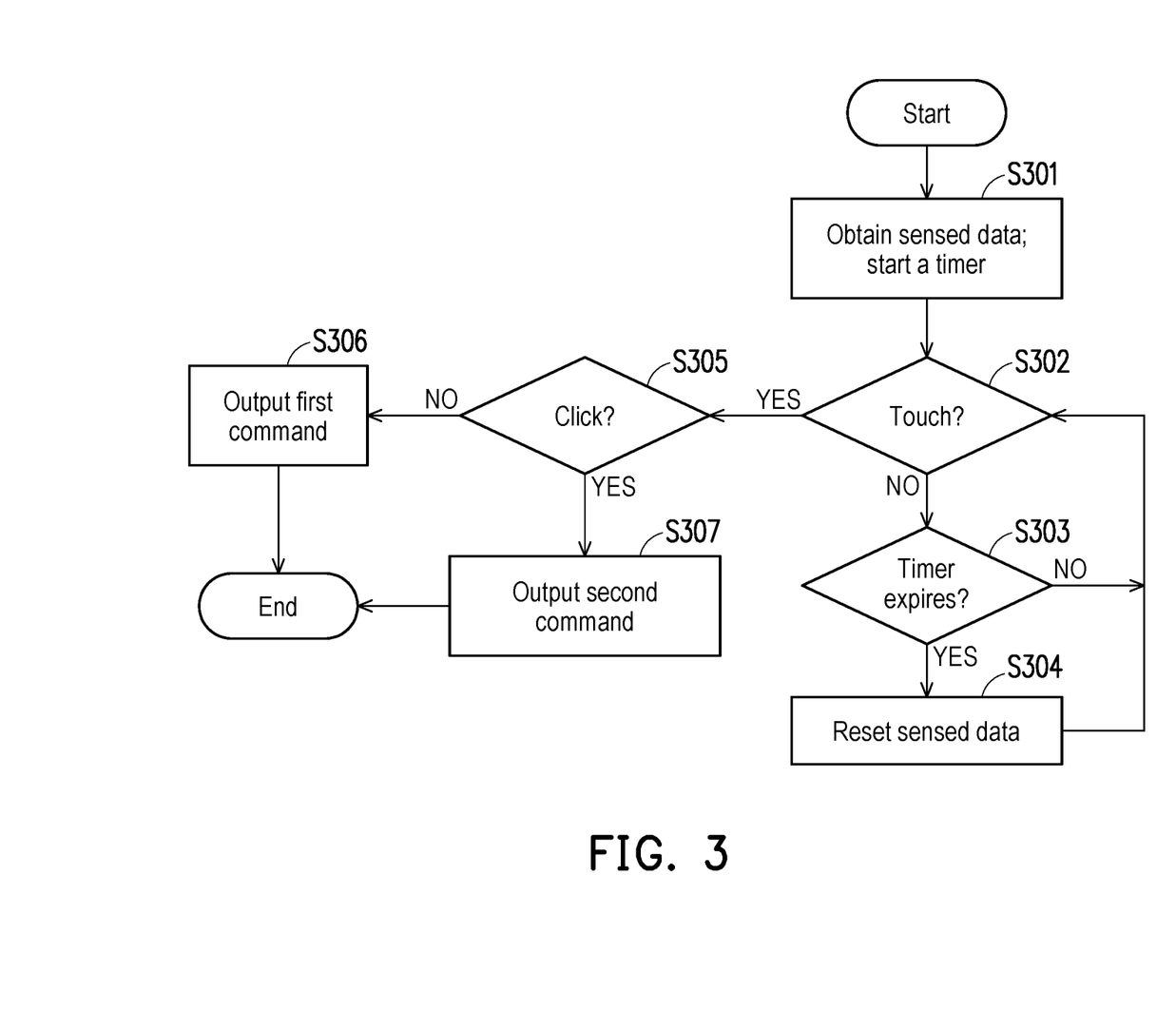
FIG. 3 illustrates a flowchart of a method for interacting with an XR environment according to one embodiment of the present invention.

FIG. 3 illustrates a flowchart of a method for interacting with an XR environment according to one embodiment of the present invention, wherein the method may be performed by the system 10 as shown in FIG. 1.

In step S301, the HMD 100 may obtain sensed data, wherein the sensed data may include the measurement result generated by the IMU 250 of the ring-type controller 200, the touch signal generated by the touch sensor 240 of the ring-type controller 200, or the image captured by the camera 140 of the HMD 100. Specifically, the HMD 100 may start a timer and obtain the sensed data when the timer is running, wherein the timer may be implemented by a circuit coupled to the processor 110 or a software stored in the storage medium 120.

In step S302, the HMD 100 may determine whether the finger (e.g., thumb of the user) wearing the ring-type controller 200 touches an object such as another finger (e.g., index finger or middle finger) of the user or a plane of the table. If the HMD 100 determines that the finger wearing the ring-type controller 200 touches an object, the system 10 may execute step S305. If the HMD 100 determines that the finger wearing the ring-type controller 200 does not touch an object, the system 10 may execute step S303.

Specifically, the HMD 100 may receive the touch signal from the ring-type controller 200 and may determine whether an object is in the detection area of the touch sensor 240 according to the touch signal. If an object is in the detection area of the touch sensor 240 for a time period, the HMD 100 may determine that a touch operation is performed by the user. On the other hand, if no object is in the detection area of the touch sensor 240 for a time period, the HMD 100 may determine that no touch operation is performed by the user.

In step S303, the HMD 100 may determine that whether the timer expires. If the timer expires, the system 10 may execute step S304. If the timer does not expire, the system 10 may execute step S302 again.

To prevent a fault caused by the accumulation of errors of the sensed data, in step S304, the HMD 100 may reset the sensed data. For example, the HMD 100 may obtain the coordinate of the ring-type controller 200 according to the touch signal generated by the touch sensor 240. When the data of the touch signal is reset, the coordinate corresponding to the current touch signal may be mapped to an origin of the coordinate system. For example, the HMD 100 may obtain the coordinate or yaw angle of the ring-type controller 200 according to the image captured by the camera 140. When the data of the image is reset, the coordinate corresponding to the current image may be mapped to an origin of the coordinate system or the yaw angle corresponding to the current image may be mapped to zero degree. For example, the HMD 100 may obtain yaw angle of the ring-type controller 200 (or the location of the CRC joint of the user's thumb wearing the ring-type controller 200) according to the measurement result generated by the IMU 250. When the data of the measurement result is reset, the yaw angle (or the location of the CRC joint) corresponding to the current measurement result may be mapped to zero degree.

In step S305, the HMD 100 may determine whether the user wearing the ring-type controller 200 performs a gesture corresponding to a click operation. If the user performs a click operation, the system 10 may execute step S307. The HMD 100 may output a second command in step S307. If the user does not perform a click operation, the system 10 may execute step S306. The HMD 100 may output a first command in step S306.

In one embodiment, the HMD 100 may determine whether the user wearing the ring-type controller 200 performs a click operation according to the touch signal. Specifically, after the HMD 100 determine that an object (e.g., index finger or table) is in the detection area of the touch sensor 240 according to the touch signal, the HMD 100 may determine whether a variation of the touch signal during a time period is greater than a threshold. If the variation of the touch signal is greater than a threshold, the HMD 100 may determine that the user performs a click operation (or the touch sensor 240 is touched by the object). The HMD 100 may output the second command accordingly. If the variation of the touch signal is less than or equal to a threshold, the HMD 100 may determine that the user does not perform a click operation. The HMD 100 may output the second command accordingly.

The first command may be generated by the HMD 100 according to a movement of the ring-type controller 200. The HMD 100 may move a cursor (e.g., cursor which is visible or invisible to the user wearing the HMD 100) in the XR scene provided by the HMD 100 according to the first command. In one embodiment, the HMD 100 may capture one or more images of the ring-type controller 200 and may perform object tracking according to the captured images so as to obtain the movement of the ring-type controller 200. In one embodiment, the HMD 100 may receive the touch signal generated by the touch sensor and may obtain the movement of the ring-type controller 200 according to the touch signal.

Figure 4:
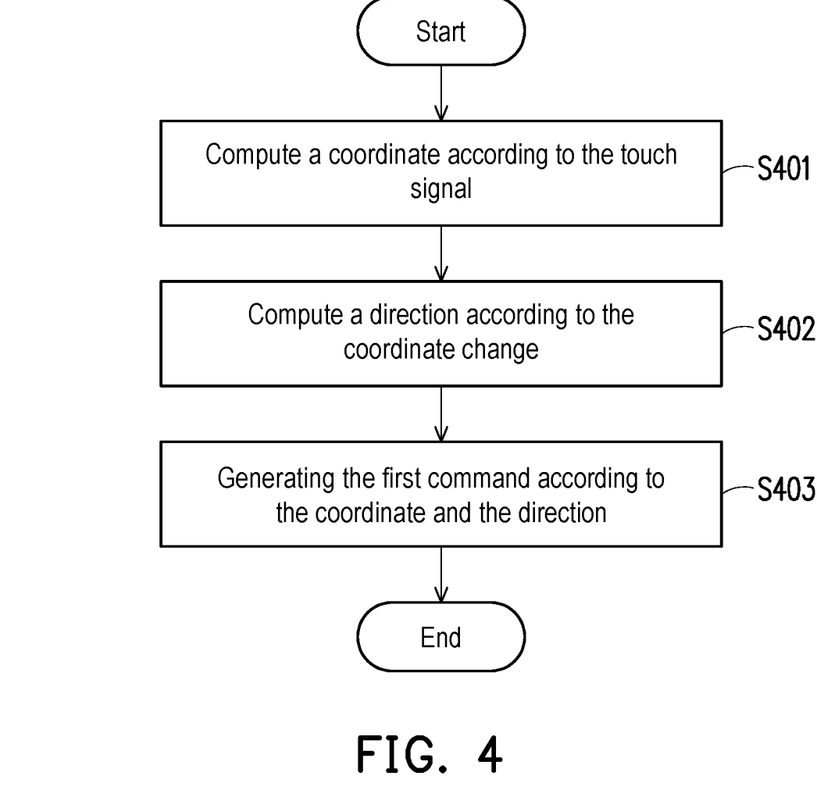
FIG. 4 illustrates a flowchart of generating the first command based on the touch signal according to one embodiment of the present invention.

FIG. 4 illustrates a flowchart of generating the first command based on the touch signal according to one embodiment of the present invention. The HMD 100 may obtain a movement of the ring-type controller 200 according to the touch signal from the touch sensor 240. Specifically, in step S401, the HMD 100 may compute a coordinate (e.g., two-dimensional coordinate) of the ring-type controller 200 according to the touch signal. In step S402, the HMD 100 may compute the direction of the ring-type controller 200 based on the change in coordinates of the ring-type controller 200. In step S403, the HMD 100 may generate the first command according to the coordinate and the direction of the ring-type controller 200. The HMD 100 may move a cursor in the XR scene provided by the HMD 100 according to the coordinate and the direction of the ring-type controller 200.

The second command may be generated by the HMD 100 according to a yaw angle $\theta_{yaw}$ of the ring-type controller 200 (or the location of the CRC joint of the user's thumb wearing the ring-type controller 200). The HMD 100 may select a virtual object (e.g., virtual button) from a plurality of virtual objects (e.g., from N virtual objects, wherein N may be a positive integer greater than 1) in the XR scene according to the second command. The user wearing the ring-type controller 200 may move, for example, the carpometacarpal joint of his thumb to apply the second command.

Figure 5:
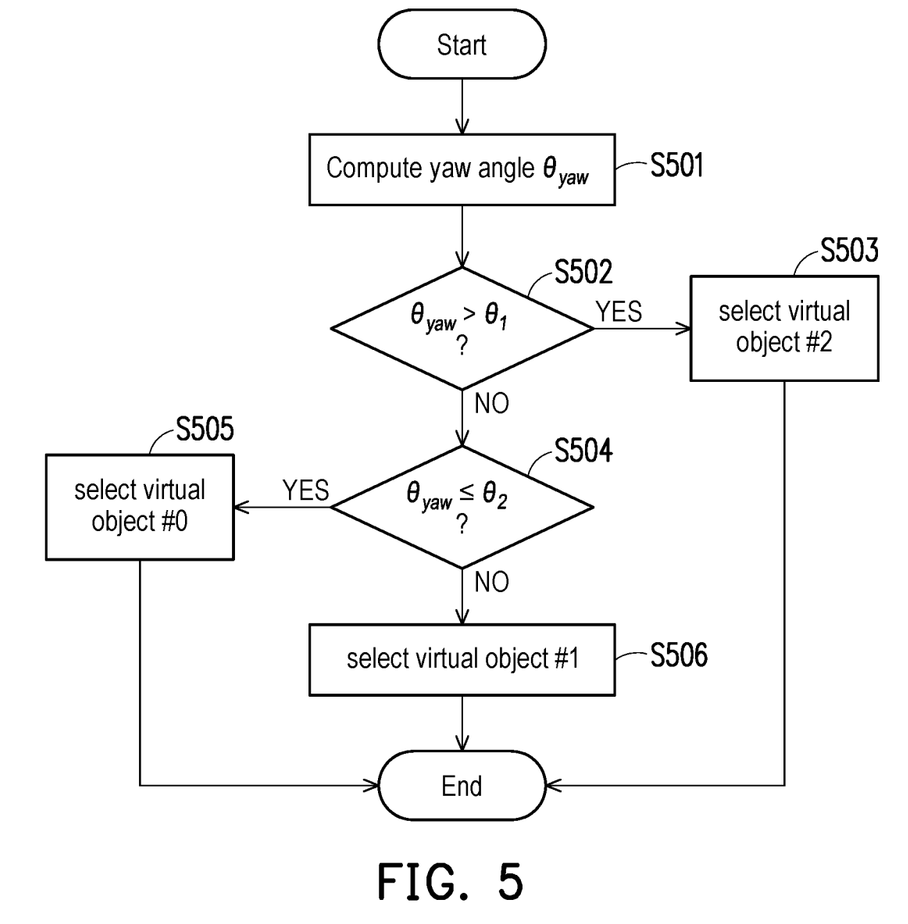
FIG. 5 illustrates a flowchart of generating the second command according to one embodiment of the present invention.

For example, the HMD 100 may select one of the three virtual objects (i.e., virtual objects #0, #1, and #2) according to the second command. FIG. 5 illustrates a flowchart of generating the second command according to one embodiment of the present invention.

In step S501, the HMD 100 may compute the yaw angle $\theta_{yaw}$ of the ring-type controller 200 according to the measurement result of the IMU 250.

In step S502, the HMD 100 may determine whether the yaw angle $\theta_{yaw}$ is greater than a threshold $\theta_1$. If the yaw angle $\theta_{yaw}$ is greater than threshold $\theta_1$, the HMD 100 may select the virtual object #2 in step S503. If the yaw angle $\theta_{yaw}$ is less than or equal to threshold $\theta_1$, the HMD 100 may execute step S504.

In step S504, the HMD 100 may determine whether the yaw angle $\theta_{yaw}$ is less than or equal to a threshold $\theta_2$, wherein threshold $\theta_2$ may be less than or equal to threshold $\theta_1$. If the yaw angle $\theta_{yaw}$ is less than or equal to threshold $\theta_2$, the HMD 100 may select the virtual object #0 in step S505. If the yaw angle $\theta_{yaw}$ is greater than threshold $\theta_2$, the HMD 100 may select the virtual object #1 in step S506.

Figure 6:
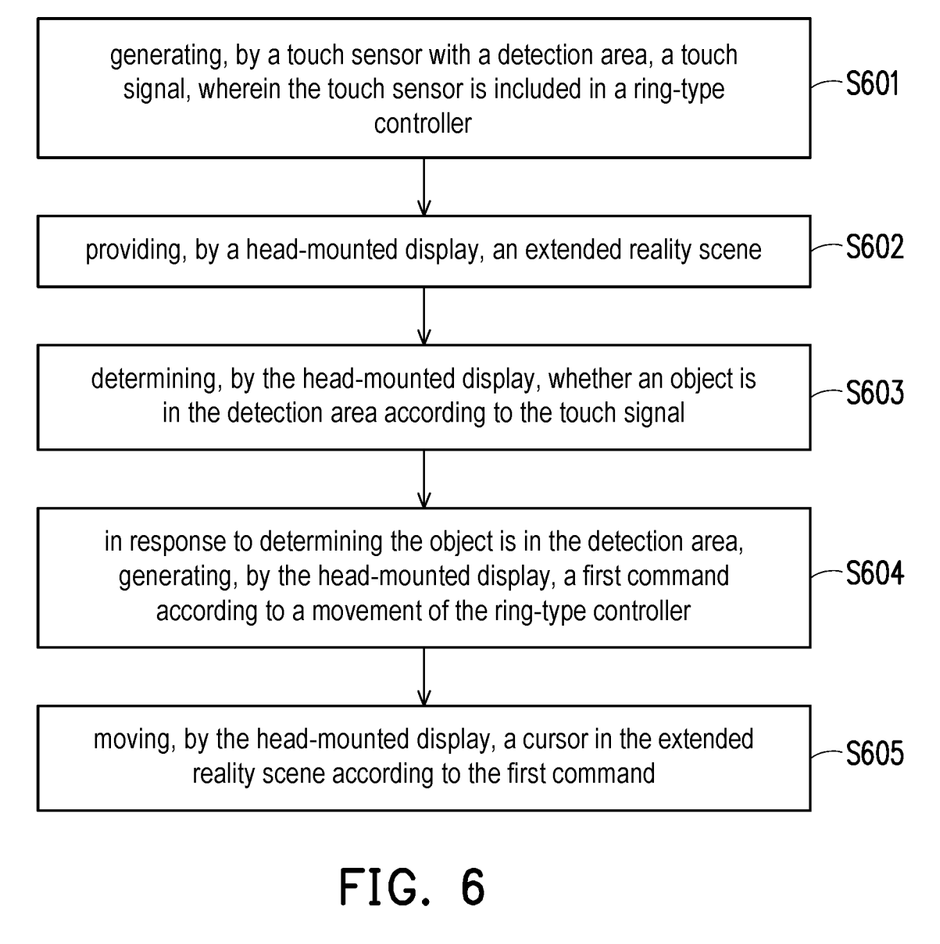
FIG. 6 illustrates a flowchart of a method for interacting with an XR environment according to one embodiment of the present invention.

FIG. 6 illustrates a flowchart of a method for interacting with an XR environment according to one embodiment of the present invention, wherein the method may be implemented by the system 10 as shown in FIG. 1. In step S601, generating, by a touch sensor with a detection area, an touch signal, wherein the touch sensor is included in a ring-type controller. In step S602, providing, by a head-mounted display, an extended reality scene. In step S603, determining, by the head-mounted display, whether an object is in the detection area according to the touch signal. In step S604, in response to determining the object is in the detection area, generating, by the head-mounted display, a first command according to a movement of the ring-type controller. In step S605, moving, by the head-mounted display, a cursor in the extended reality scene according to the first command.

Figure 7:
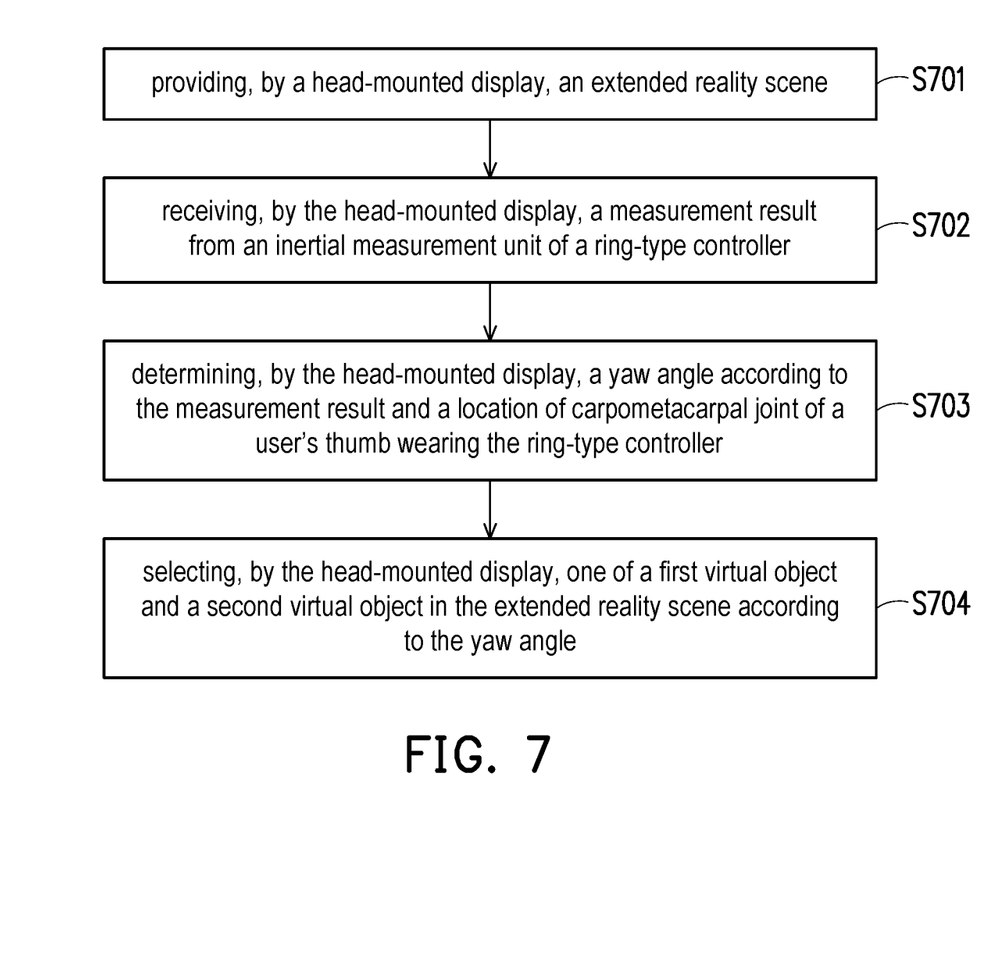
FIG. 7 illustrates a flowchart of another method for interacting with an XR environment according to one embodiment of the present invention.

FIG. 7 illustrates a flowchart of another method for interacting with an XR environment according to one embodiment of the present invention, wherein the method may be implemented by the system 10 as shown in FIG. 1. In step S701, providing, by a head-mounted display, an extended reality scene. In step S702, receiving, by the head-mounted display, a measurement result from an inertial measurement unit of a ring-type controller. In step S703, determining, by the head-mounted display, a yaw angle of the ring-type controller according to the measurement result and a location of carpometacarpal joint of a user's thumb wearing the ring-type controller. In step S704, selecting, by the head-mounted display, one of a first virtual object and a second virtual object in the extended reality scene according to the yaw angle.

In summary, the system of the present invention provides a ring-type controller for the user of an HMD. When the ring-type controller is worn on the thumb of the user, the ring-type controller may detect the gestures of the user of the HMD, wherein the gestures may include, for example, moving the thumb or performing a click operation. The user may, for example, moving a cursor in the XR scene or selecting an object in the XR scene by the hand gestures. Accordingly, the present invention provides a convenient and intuitive way for the user of an HMD to interact with the XR environment provided by the HMD.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A system for interacting with an extended reality environment, comprising:
   a ring-type controller, comprising a touch sensor with a detection area, wherein the touch sensor generates a touch signal; and
   a head-mounted display, communicatively connected to the ring-type controller and is configured to:
   provide an extended reality scene;
   determine whether an object is in the detection area according to the touch signal;
   in response to determining the object is in the detection area, generate a first command according to a movement of the ring-type controller;
   move a cursor in the extended reality scene according to the first command;
   in response to determining the object is in the detection area, generate a second command according to a yaw angle of the ring-type controller; and
   select one of a first virtual object and a second virtual object in the extended reality scene according to the second command.

2. The system according to claim 1, wherein the head-mounted display is further configured to:
   in response to the yaw angle being greater than a first threshold, select the first virtual object in the extended reality scene; and
   in response to the yaw angle being less than or equal to a second threshold, select the second virtual object in the extended reality scene.

3. The system according to claim 1, wherein the ring-type controller further comprises an inertial measurement unit, and the head-mounted display is further configured to:
   receive a measurement result from the inertial measurement unit; and
   determine the yaw angle according to the measurement result and a location of a carpometacarpal joint of a user's thumb wearing the ring-type controller.

4. The system according to claim 1, wherein the head-mounted display comprises a camera and is further configured to:
   capture an image of a hand of a user wearing the ring-type controller; and
   determine the yaw angle of the ring-type controller according to the image.

5. The system according to claim 1, wherein the ring-type controller forms a virtual circular plane and a yaw axis of the ring-type controller is perpendicular to a normal of the virtual circular plane.

6. The system according to claim 1, wherein the head-mounted display is further configured to:
   start a timer and obtain sensed data when the timer is running, wherein the sensed data is for computing the yaw angle;
   in response to determining the object is not in the detection area, determine whether the timer expires; and
   in response to determining the timer expires, reset the sensed data.

7. The system according to claim 1, wherein the head-mounted display is further configured to:
   in response to determining the object is in the detection area, determine whether a variation of the touch signal during a time period is greater than a threshold; and
   in response to determining the variation is greater than the threshold, generate the second command.

8. The system according to claim 1, wherein the head-mounted display is further configured to:
   in response to determining the object is in the detection area, determine whether a variation of the touch signal during a time period is greater than a threshold; and
   in response to determining the variation is less than or equal to the threshold, generate the first command.

9. The system according to claim 1, wherein the touch signal comprises an optical sensor generating an optical signal, and the head-mounted display is further configured to:
   obtain the movement of the ring-type controller according to the optical signal.

10. The system according to claim 1, wherein the head-mounted display further comprises a camera and is further configured to:
   capture an image of the ring-type controller; and
   obtain the movement of the ring-type controller according to the image.

11. The system according to claim 1, wherein the ring-type controller is for being worn on a first finger of a user's hand, and the detection area of the touch sensor is directed to a second finger of the user's hand when the ring-type controller is worn on the user's hand.

12. The system according to claim 1, wherein the ring-type controller is for being worn on a first finger of a hand, and the detection area of the touch sensor is directed to a plane of an object when the ring-type controller is worn on the hand resting on the plane.

13. A method for interacting with an extended reality environment, comprising:
   generating, by a touch sensor with a detection area, a touch signal, wherein the touch sensor is comprised in a ring-type controller;
   providing, by a head-mounted display, an extended reality scene;
   determining, by the head-mounted display, whether an object is in the detection area according to the touch signal;
   in response to determining the object is in the detection area, generating, by the head-mounted display, a first command according to a movement of the ring-type controller;
   moving, by the head-mounted display, a cursor in the extended reality scene according to the first command;
   in response to determining the object is in the detection area, generating, by the head-mounted display, a second command according to a yaw angle of the ring-type controller; and
   selecting, by the head-mounted display, one of a first virtual object and a second virtual object in the extended reality scene according to the second command.

14. A system for interacting with an extended reality environment, comprising:
   a ring-type controller, comprising an inertial measurement unit; and
   a head-mounted display, communicatively connected to the ring-type controller and is configured to:
   provide an extended reality scene;
   receive a measurement result from the inertial measurement unit;
   determine a yaw angle according to the measurement result and a location of a carpometacarpal joint of a user's thumb wearing the ring-type controller; and
   select one of a first virtual object and a second virtual object in the extended reality scene according to the yaw angle.

* * * * *